A. J. LAVOIE.
CUTTER BORING ARM.
APPLICATION FILED JULY 26, 1918.
1,399,971. Patented Dec. 13, 1921.
2 SHEETS—SHEET 1.
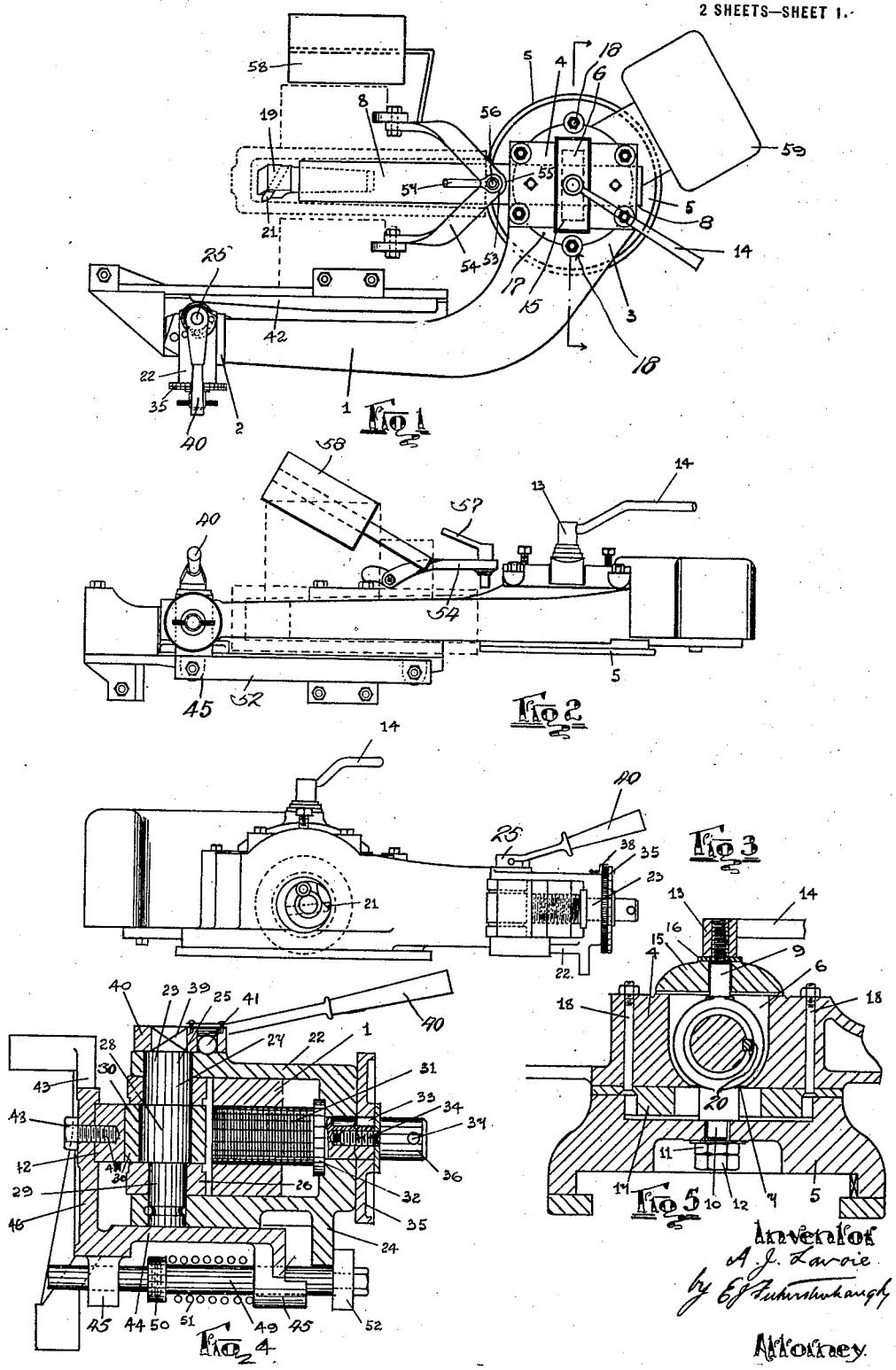

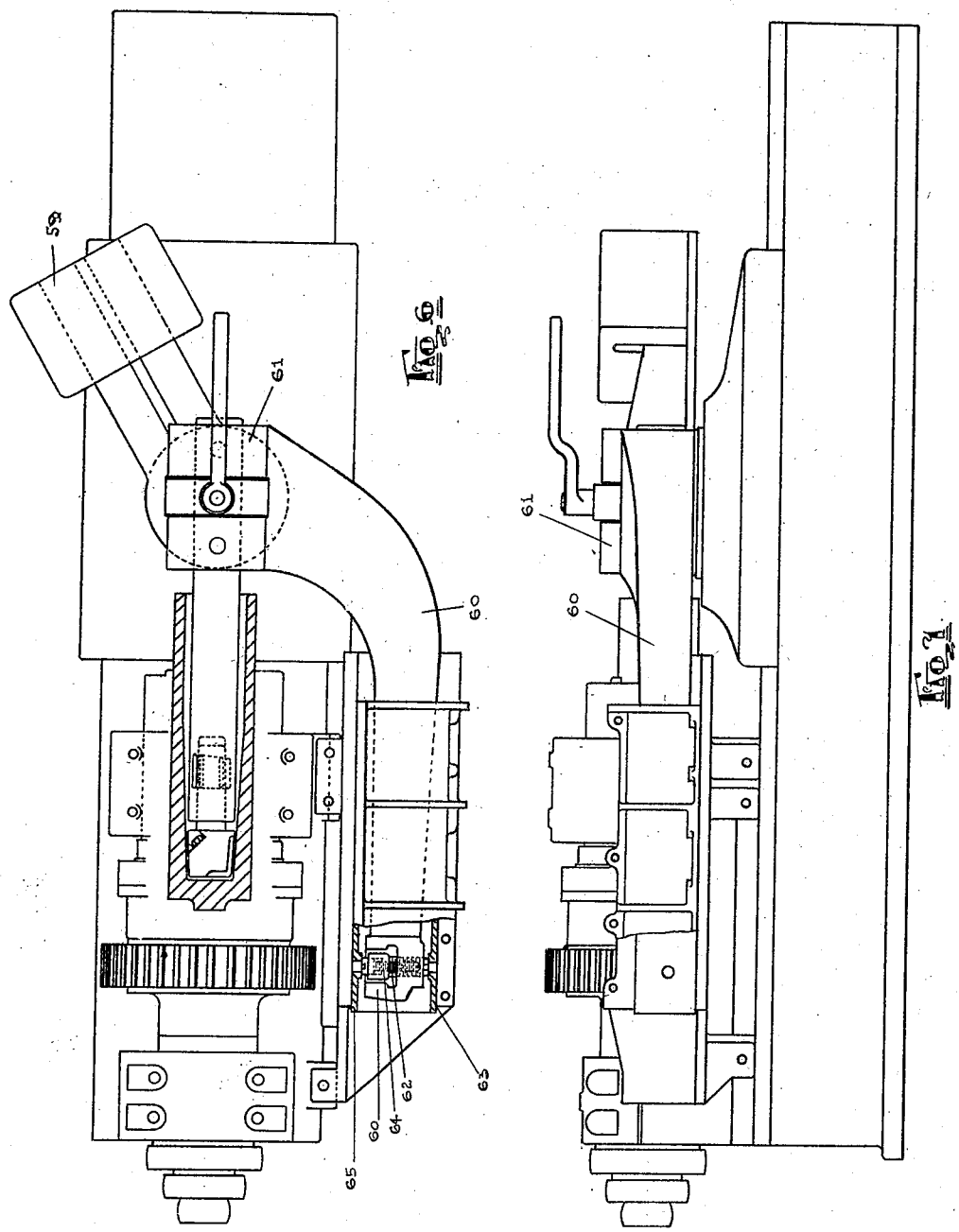

UNITED STATES PATENT OFFICE.

ALPHONSE JOSEPH LAVOIE, OF MONTREAL, QUEBEC, CANADA.

CUTTER-BORING ARM.

1,399,971. Specification of Letters Patent. Patented Dec. 13, 1921.

Application filed July 26, 1918. Serial No. 246,890.

*To all whom it may concern:*

Be it known that I, ALPHONSE JOSEPH LAVOIE, a subject of the King of Great Britain, and resident of 154 Prud'homme avenue, in the city and district of Montreal, in the Province of Quebec, in the Dominion of Canada, have invented certain new and useful Improvements in Cutter-Boring Arms, of which the following is the specification.

The invention relates to improvements in cutter guide arms as described in the present specification and illustrated in the accompanying drawings that form part of the same.

The invention consists essentially of the novel means employed whereby the accompanying arm to the cutting tool serves as a positive guide in directing the boring operations.

The objects of the invention are to facilitate the boring of shells in munition works and other articles requiring somewhat similar treatment, to turn out reliable work, to save labor and consequently costs in production; and generally to provide an efficient, durable and convenient tool.

In the drawings, Figure 1 is a plan view of the cutter and arm as applied to a machine in boring a shell.

Fig. 2 is a side elevation of the mechanism illustrated in Fig. 1.

Fig. 3 is an end elevation of the invention.

Fig. 4 is a vertical sectional view of the adjusting and releasing members.

Fig. 5 is a vertical sectional view of turret members.

Fig. 6 is a plan view of a modified form of the invention.

Fig. 7 is a side elevation of the invention as illustrated in Fig. 6.

Referring to the drawings, the guide arm 1 is formed with the slotted outer extremity 2, and at the other end 3 is inwardly curved and terminates in the rotating turret end 4, the latter being supported on the carriage 5 and having a central opening 6 therethrough, said opening converging from a wide top portion to the narrow outlet 7 at the bottom 1, the boring bar passage 8 extending through the walls of said opening and registering therewith.

The turret end 4 is secured to the carriage 5 by the eye bolt 9 having its lower end extending through the bottom where it is secured by the nut 11, locked by the nut 12. The lever nut is mounted on the upper threaded end of the eye bolt 9 and is operated by the handle 14 over the clamping plate 15 with the washer 16 therebetween, said clamping plate engaging said turret end 4 around the opening 6.

The centering plate 17 is introduced under the member 4 and secured by the bolts 18, and extends into the central recess in said base having a central opening for the eye bolt 9.

The boring bar 19 is held in the passage 8 by the key 20 and carries at its outer end the cutter 21.

The carriage 5 travels forwardly in cutting operations and backwardly in the return movement as customary in boring machines.

The position of the cutter in the bar is first adjusted for the work in hand and the screw pins tightened, then the cutter will swing with the arm and to all intents and purposes they are integral.

The adjusting and releasing head 22 is mounted at the slotted outer extremity of the arm 1 and is formed with a horizontal shaft orifice through its front wall, the vertical pin bearings 23, adjacent to the inner ends of its top and bottom sides and the downwardly extending stop 24.

The pin 25 is mounted in the pin bearings 23 and in the collars 26, said pin being formed in sections 27, 28, and 29, of different diameters, 28 being eccentric to the upper section 27 and eccentric to the lower section 29 forming a bearing for the roller 30, which rotates freely thereon.

The adjusting screw 31 is screw-threaded into that portion of the arm 1, extending into the head 22, said screw 31 having the rim 32 at the outer end portion engaging the inner side of the front wall of said head. The head end or crown 33 of the screw 31 is journaled in the front wall of the adjusting head 22 and is squared outside said front wall.

The graduation wheel 35 is mounted on the squared portion of the crown 33 and rigidly held by the head of the pin 36 screw-threaded into the hole 34, the pin hole 37 being made for the insertion of a pin to release the said head, so that the graduation wheel 35 may be turned in adjusting the said adjusting head 22 in relation to the arm 1, for it will be seen that the shoulder on said adjusting screw will operate said head in adjusting the arm 1 and consequently the cutter.

The threads on the adjusting screw correspond with the graduations on the wheel 35, therefore the travel of said wheel is guided according to the number of threads required in the adjustment and this may be done by steps of one one-thousandth of an inch or less. The pointer 38 is secured at the top of the head 1 to enable the operator to accurately determine the number of threads needed inwardly or outwardly.

It should have been stated that the eccentric pin 25 terminates in a squared top 39 on which is mounted the crank 40, said crank 40 having a spring ball lock 41, which automatically locks in corresponding recesses, though a simple pin may be used instead with good effect, the main feature in this part being the turning of the eccentric to and from the machine according to the position required for the roller, that is to say, in engagement or out of engagement as the case may be, otherwise, the said pin 25 is rigid and remains a fixed bearing for the said roller 30, which rolls on the face of the cam 42, which is formed in the shape of a long guide bar corresponding precisely with the finished cut in the interior of the shell.

The cam 42 is here shown as rigidly secured to a bracket 43, though it may be secured direct to the machine frame, if the latter is suitably formed.

The bracket 43 is rigidly secured to the frame of the machine and is here shown as substantially L-shaped, the horizontal section 44 having the downwardly extending lugs 45 and the vertical section 46 having the screw holes 47, through which the screws 48 secure the cam 42 to said bracket.

The shoe 22 slides on the horizontal section 44 in the operation of boring, though on the backward movement it clears said section and bracket entirely so that the arm and cutter can be swung outwardly.

As explained, the lugs 45 are rigid with the machine frame 1, therefore the rods 49, which are slidably supported in the lugs 45, operate in fixed bearings independently of the arm 1. At their outer ends the said rods 49 carry the bar 52, which in turn is engaged by the lug 24 of the head 22. The rods 49 are spring-held to their inner position by the encircling springs 51 between the outer lugs 45 and the collars 52, consequently the head 22 is resiliently held to its engagement through the roller 30 with the cam bar 42.

The gage 53 is pivotally secured by its arms 54 to the frame of the machine, said arms being preferably integral at their meeting point 55, and having journaled therein the pin 56, which is operated by the handle 57 and at its inner end operates the eccentric roller 56 to engage with the shell being bored.

The weight of the gage 53 is compensated for by the balance weight 58, consequently there is no weight of any consequence on the piece of work.

The balance weight 59 is held out from the rotating member 4 of the turret structure compensates for the weight of the arm 1 and boring bar, thereby maintaining the turret in running shape and keeping the boring bar from being depressed.

In the operation of this device, the turret of the machine travels forwardly and backwardly as customary in boring machines.

In the cutting operation the shell blank is rapidly rotated and the turret carriage is set in motion forwardly.

The roller 30 follows the shape of the cam 42, therefore as the pull of the cutter is toward the arm 1, naturally the cutter will complete a hole in the blank of precisely the same shape as the cam 42.

In Figs. 6 and 7 the arm 60 is shown as supported similarly to the arm 1 in a turret 61 of substantially the same construction as the turret hereinbefore described, though it may be made in any form that lends itself to the inclusion of the improvements set forth in this description.

The adjusting screw 62 is screw-threaded in the arm 60 and abuts at its head end the shoe 63, and the adjusting screw 64 is screw-threaded into the screw 62 and at its head end abuts the shoe 65.

The shoes 63 and 65 travel in the box or bracket 66 and the arm 60 is adjusted between the fixed tracks in said bracket 66 by the said adjusting screws 62 and 64.

This device affords the advantage of reducing the length of the machine, as it is unnecessary to lengthen out the machine to take in an article of a defined length, that is to say, to provide room to remove the article. The arm may be swung out to remove the work from the chuck, or the work may be carried out on the boring bar and removed, in fact, the work can be taken off, or placed on the boring bar, while the latter is in its outward position to which it is moved in swinging the arm outwardly.

The location of the boring arm bearing and cam away from cutting lubricants and boring chips and grit, lengthens the life of the machine and tooling equipment.

The operation of the adjusting parts has been fairly well explained in the description of the details, but it may be mentioned that the distance between the arm and the cam 42 in Figs. 1 to 5 is governed by the micrometer threaded adjusting screw, which is operated by the graduation wheel, consequently a deeper or shallower cut may be made in work.

Many changes may be made without departing from the spirit of the invention, so long as they are within the claims for novelty following.

What I claim is:—

1. In a device of the class described, a reciprocating member, a pivoted base thereon, a tool carrying member rigidly held by said base, and a guide arm extending from the base in the same direction as the tool carrying member and a guide for engagement by the guide arm for swinging the base and therewith the tool carrying member.

2. In a device of the class described, a reciprocating carriage, a cutter adjustably held therefrom and having a guiding arm extending from said base parallel with the line of direction of the cut, a cam track, a pin having a section thereof eccentric to its axis, a bearing for said pin carried by said arm, a roller journaled on said eccentric section and a handle for said pin adapted to disengage said roller from the cam track and return it to engagement.

3. In a boring arm, a reciprocating carriage, a guiding arm and a tool carrying member swinging from said carriage, a cam track rigid with the machine frame and guiding said tool carrying member through said arm, an adjusting head mounted at the end of said arm, an adjusting screw having a shoulder engaging said head and screw-threaded into said arm and rotatively mounted in said head for adjusting the position of said arm, a graduation wheel fixedly mounted on said adjusting screw and having markings corresponding with the threaded adjusting member, and a pin having a head clamping said graduation wheel to said adjusting screw.

4. In a device of the class described, a tool carrying member and an accompanying guiding arm swinging horizontally from the machine, a machine frame, a guide fixedly secured to said frame, and a vertical pin having an eccentric section and a loose roller mounted on said section adapted to engage the guiding surface in one position of the pin and to be released on turning the pin from said position.

Signed at the city of Montreal, Quebec, Canada, this 26th day of June 1918.

ALPHONSE JOSEPH LAVOIE.